(12) United States Patent
Matsuyama et al.

(10) Patent No.: US 8,800,783 B2
(45) Date of Patent: Aug. 12, 2014

(54) POLYAMIDE HOLLOW FIBER MEMBRANE, AND PRODUCTION METHOD THEREOF

(75) Inventors: Hideto Matsuyama, Hyogo (JP); Takahiro Ono, Kyoto (JP); Satoshi Kawanaka, Kyoto (JP); Kazuo Hirota, Osaka (JP)

(73) Assignee: Unitika Ltd., Hyogo (JP)

( * ) Notice: Subject to any disclaimer, the term of this patent is extended or adjusted under 35 U.S.C. 154(b) by 343 days.

(21) Appl. No.: 13/119,506

(22) PCT Filed: Sep. 29, 2009

(86) PCT No.: PCT/JP2009/004964
§ 371 (c)(1),
(2), (4) Date: Mar. 17, 2011

(87) PCT Pub. No.: WO2010/038414
PCT Pub. Date: Apr. 8, 2010

(65) Prior Publication Data
US 2011/0168628 A1    Jul. 14, 2011

(30) Foreign Application Priority Data
Sep. 30, 2008    (JP) .................................. 2008-253798

(51) Int. Cl.
| | |
|---|---|
| *B01D 71/26* | (2006.01) |
| *B01D 39/00* | (2006.01) |
| *B01D 39/14* | (2006.01) |
| *B01D 33/21* | (2006.01) |
| *B01D 67/00* | (2006.01) |
| *B29C 47/00* | (2006.01) |
| *B29C 47/12* | (2006.01) |
| *B29C 47/88* | (2006.01) |
| *B29C 47/90* | (2006.01) |
| *B01D 71/56* | (2006.01) |

(52) U.S. Cl.
CPC ...................................... B01D 71/56 (2013.01)
USPC ............. 210/500.38; 210/500.23; 210/502.1; 264/177.14; 264/177.17; 264/178 R

(58) Field of Classification Search
CPC .... B01D 71/64; B01D 63/02; B01D 67/0009; B01D 71/56; B01D 69/08; C02F 1/444; B29C 47/889
USPC .................. 210/500.38, 500.23, 500.27, 650, 210/502.1; 264/41, 177.14, 178 R, 177.17
See application file for complete search history.

(56) References Cited

U.S. PATENT DOCUMENTS

| | | | | |
|---|---|---|---|---|
| 3,980,605 | A | * | 9/1976 | Steigelmann et al. ....... 428/36.6 |
| 4,247,498 | A | | 1/1981 | Castro |

(Continued)

FOREIGN PATENT DOCUMENTS

| | | |
|---|---|---|
| JP | 57-105212 | 6/1982 |
| JP | 58-65009 | 4/1983 |

(Continued)

OTHER PUBLICATIONS

Marcel Mulder; Thermally-induced phase separation, TIPS; May 10, 1997.

(Continued)

*Primary Examiner* — Ana Fortuna
(74) *Attorney, Agent, or Firm* — Fildes & Outland, P.C.

(57) ABSTRACT

A hollow fiber membrane is produced through a thermally induced phase separation process by dissolving a highly hydrophilic polyamide resin in a high-boiling-point solvent such as an aprotic polar solvent at a temperature of not lower than 100° C. The hollow fiber membrane has a membrane surface having a water contact angle of not greater than 80 degrees, and has a water permeability of not less than 100 L/m²·atm·h and a 0.1-μm particle rejection percentage of not less than 90%.

8 Claims, 4 Drawing Sheets

(56) References Cited

U.S. PATENT DOCUMENTS

| | | | |
|---|---|---|---|
| 4,274,498 A * | 6/1981 | Penny | 175/228 |
| 4,340,479 A | 7/1982 | Pall | |
| 4,450,126 A * | 5/1984 | Kesting | 264/41 |
| 4,454,085 A | 6/1984 | Schindler et al. | |
| 4,477,598 A | 10/1984 | Kesting | |
| 4,482,514 A | 11/1984 | Schindler et al. | |
| 4,594,207 A | 6/1986 | Josefiak et al. | |
| 4,666,607 A | 5/1987 | Josefiak et al. | |
| 4,774,038 A * | 9/1988 | Ditter et al. | 264/41 |
| 4,774,039 A * | 9/1988 | Wrasidlo | 264/41 |
| 4,838,904 A * | 6/1989 | Sanders et al. | 96/10 |
| 4,888,115 A * | 12/1989 | Marinaccio et al. | 210/636 |
| 4,915,886 A | 4/1990 | Repetti et al. | |
| 4,935,141 A * | 6/1990 | Buck et al. | 210/500.38 |
| 5,215,662 A | 6/1993 | Johnson et al. | 210/500.38 |
| 5,444,097 A * | 8/1995 | Tkacik | 521/61 |
| 6,805,730 B2 * | 10/2004 | Herczeg | 96/8 |
| 6,890,435 B2 * | 5/2005 | Ji et al. | 210/500.23 |
| 2005/0121385 A1 * | 6/2005 | Demmer et al. | 210/500.26 |
| 2009/0252948 A1 * | 10/2009 | Kools | 428/310.5 |
| 2011/0168631 A1 * | 7/2011 | Yeager et al. | 210/651 |

FOREIGN PATENT DOCUMENTS

| | | |
|---|---|---|
| JP | 58-164622 | 9/1983 |
| JP | 60-52612 | 3/1985 |
| JP | 62-64836 | 3/1987 |
| JP | 2000-001612 | 1/2000 |
| JP | 2003-534908 | 11/2003 |
| JP | 2005-193193 | 7/2005 |
| WO | 01/93994 | 12/2001 |

OTHER PUBLICATIONS

B.J. Cha, K. Char, J.J. Kim, S.S. Kim, C.K. Kim; The effects of diluent molecular weight on the structure of thermally-induced phase separation membrane; Jun. 19, 1995; Journal of Membrane Science 108 (1995) pp. 219-229.

* cited by examiner

POLYAMIDE HOLLOW FIBER MEMBRANE, AND PRODUCTION METHOD THEREOF

TECHNICAL FIELD

The present invention relates to a polyamide hollow fiber membrane and a production method thereof. Particularly, the present invention relates to a polyamide hollow fiber membrane which functions as a tubular porous filtration membrane, and a production method thereof.

BACKGROUND ART

In recent years, porous filtration membranes such as ultrafiltration membranes and microfiltration membranes have been increasingly used in various industrial fields including the field of water treatment associated with the production of drinking water, clean water/waste water treatment, hemocatharsis and other medical applications, and the food industry, and the field of organic solvent treatment associated with the refinement of waste oil, the production of bio-ethanol and the filtration of chemical agents in the semiconductor industry. To this end, porous filtration membranes having various pore size have been developed. Particularly, common porous filtration membranes having pore size on the order of nm to μm are generally produced by the phase separation of an organic polymer solution. This process is applicable to various organic polymer compounds to permit easy industrialization and, therefore, has become a predominant process for industrially producing the filtration membranes.

The phase separation process generally includes a non-solvent induced phase separation process (NIPS process) and a thermally induced phase separation process (TIPS process). In the NIPS process, a homogeneous polymer solution experiences phase separation due to a change in concentration caused by ingress of a non-solvent or evaporation of the solvent to the outside atmosphere. On the other hand, the TIPS process is a relatively new process, in which a homogeneous polymer solution prepared by dissolution of a polymer at a higher temperature is cooled to a temperature below a binodal curve (a boundary line between a first phase and a second phase) to induce the phase separation and the resulting structure is fixed by the crystallization or glass transition of the polymer.

Exemplary materials for the porous filtration membranes to be often used in the known art include polyolefins such as polyethylenes and polypropylenes, polyvinylidene fluorides, polysulfones, polyether sulfones, polyacrylonitriles and cellulose acetates. However, the polyolefins, the polyvinylidene fluorides, the polysulfones, the polyether sulfones and the like are highly hydrophobic. Where a porous filtration membrane is formed from any of these materials, therefore, the porous filtration membrane disadvantageously has a lower water flow rate, and is liable to be fouled to have a reduced water permeability because of its nature of adsorbing hydrophobic substances such as proteins. The polyacrylonitriles, the cellulose acetates and the like are more hydrophilic resins, but a membrane formed from any of these resins is poor in strength and less resistant to temperature and chemicals. Therefore, the membrane is usable in a very narrow temperature range and in a very narrow pH range. The polyvinylidene fluorides, the polysulfones, the polyether sulfones and the like are less resistant to organic solvents and, therefore, cannot be used for filtration of the organic solvents.

Therefore, a method of producing a porous membrane from a polyamide resin which is relatively highly hydrophilic and highly resistant to chemicals is contemplated. However, the polyamide resin is soluble only in a strong acid such as formic acid or concentrated sulfuric acid or in an expensive fluorine-containing solvent. Therefore, there is no other way but to use any of these solvents for the production method employing the NIPS process.

Membrane production methods employing formic acid as the solvent are disclosed, for example, in JP57-105212A (1982), JP58-065009A (1983), U.S. Pat. No. 4,340,479B and U.S. Pat. No. 4,477,598B. However, these membrane production methods are likely to pose health and safety problems. JP2000-001612A discloses a method which includes the steps of dissolving polyamide 6 mixed with polycaprolactone in hexafluoroisopropanol, casting the resulting solution, and extracting polycaprolactone from the resulting product to produce a porous product. However, this method is impractical, because the solvent to be used and the polymer to be extracted off are highly expensive.

On the other hand, a method employing the TIPS process is also contemplated. Journal of Membrane Science 108, pp 219-229 (1995) states that a porous membrane can be produced by employing polyamide 12 and polyethylene glycol in combination. U.S. Pat. No. 4,247,498B states that a porous membrane can be produced by employing polyamide 11 and one of ethylene carbonate, propylene carbonate and sulfolane in combination. Membrane Technology $2^{nd}$ Edition, authored by Marcel Mulder under the supervision of Masakazu Yoshikawa, Takeshi Matsuura and Tsutomu Nakagawa and published by IPC, pp 95 (1997), states that a porous membrane of polyamide 6 and polyamide 12 can be produced by employing triethylene glycol as a solvent. However, these methods merely permit the production of porous membranes, but fail to impart the hollow fiber membranes with a higher water permeability and to control the pore size of the membranes.

As described above, the polyamides can be used for producing a hollow fiber membrane through the NIPS process employing formic acid and for producing a porous membrane through the TIPS process. However, it is very difficult to produce a hollow fiber membrane through the TIPS process, because the solution resulting from the higher temperature dissolution has a lower viscosity and a lower specific gravity. Therefore, there is virtually no successful example. JP58-164622A, for example, discloses porous membranes formed from various types of resins through the TIPS process and examples of polyamide flat membranes, but provides no teaching on production of a polyamide hollow fiber membrane. JP60-052612 discloses a method of producing a hollow fiber membrane through the TIPS process. However, the resulting hollow fiber membrane has a very great pore size, i.e., 1.4 μm and, therefore, cannot be used for filtration processes intended by the present invention, i.e., for ordinary water treatment, blood treatment and filtration processes in the food industry and the pharmaceutical industry. JP60-052612 states that a membrane can be produced by using glycerin or ethylene glycol. However, the membrane thus produced fails to have sufficient strength for practical use. In U.S. Pat. No. 4,915,886B, an apparatus of producing a polyamide hollow fiber membrane through the TIPS process is described in detail. However, no detailed description is given to the type of the polyamide and a usable solvent, and no inventive example is provided. Even though permitting the production of the hollow fiber membrane, U.S. Pat. No. 4,915,886B does not teach the formulation and the properties of the resin. JP2003-534908A (WO01/093994) discloses a method which involves addition of an antioxidant for suppression of decomposition of a polyamide membrane. However, a solvent used in this method is expensive. JP2003-

534908A states that a hollow fiber membrane production method of an inventive example involves addition of a thickener, and that the resulting hollow fiber membrane has a greater pore size, i.e., a maximum pore size of 0.87 μm and 0.57 μm, but provides no other detailed description.

As described above, a technique related to a polyamide hollow fiber membrane having a higher water permeability and a higher particle rejection percentage is not known yet.

SUMMARY OF THE INVENTION

Problems to be Solved by the Invention

In order to solve the problems described above, it is a technical object of the present invention to provide a polyamide hollow fiber membrane which has a highly hydrophilic membrane surface, and is excellent in separation capability and less susceptible to fouling.

Solution to Problems

As a result of intensive studies to solve the problems described above, the inventors of the present invention found that a highly water-permeable membrane having uniform pore size can be produced by dissolving a highly hydrophilic polyamide resin in a specific organic solvent at a higher temperature and cooling the resulting solution to cause phase separation, and attained the present invention.

According to a first aspect of the present invention, there is provided a polyamide hollow fiber membrane, which comprises a polyamide resin containing a methylene group and an amide group in a molar ratio of —$CH_2$—:—NHCO—=4:1 to 10:1, the hollow fiber membrane having a membrane surface having a water contact angle of not greater than 80 degrees, the hollow fiber membrane having a water permeability of not less than 100 L/$m^2$·atm·h and a 0.1-μm particle rejection percentage of not less than 90%. The polyamide resin is preferably one or two or more polyamide resins selected from the group consisting of polyamide 6, polyamide 66, polyamide 46 and polyamide 610.

According to a second aspect of the present invention, there is provided a polyamide hollow fiber membrane production method, which comprises: preparing a membrane formation dope solution by dissolving a polyamide resin in an organic solvent at a temperature of not lower than 100° C., the organic solvent having a boiling point of not lower than 150° C. and being insoluble with the polyamide resin at a temperature lower than 100° C.; extruding the membrane formation dope solution through a hollow fiber spinneret into a coagulation liquid kept at a temperature of lower than 100° C. to form a hollow fiber; and immersing the hollow fiber in another solvent to remove the organic solvent to form a hollow fiber membrane.

Effects of the Invention

According to the present invention, the polyamide hollow fiber membrane can be provided, which is highly hydrophilic and highly resistant to organic fouling, and has a higher water permeability and a higher particle rejection ability. The inventive polyamide hollow fiber membrane is advantageously employed in the field of clean water/waste water treatment, the food industry, the pharmaceutical industry, the semiconductor industry and the medical industry (for hemocatharsis and the like).

The inventive polyamide hallow fiber membrane is highly hydrophilic. Therefore, even if the pore size of the polyamide hollow fiber membrane are reduced to increase the particle rejection percentage, the polyamide hollow fiber membrane has a higher water permeability than the conventionally used membranes formed from polyolefins such as polyethylenes and polypropylenes, polyvinylidene fluorides, polysulfones and polyether sulfones. The inventive polyamide hollow fiber membrane, which is highly hydrophilic, is capable of separating highly hydrophilic particles by adsorption when being used in an organic solvent system.

EMBODIMENTS OF THE INVENTION

The present invention will hereinafter be described in detail.

A polyamide resin to be used for an inventive hollow fiber membrane is not particularly limited, as long as the effects of the present invention are not impaired. However, the polyamide resin should contain a methylene group and an amide group in a molar ratio of —$CH_2$—:—NHCO—=4:1 to 10:1. Particularly, the polyamide resin is preferably a relatively inexpensive aliphatic polyamide. Examples of the polyamide resin include polyamide 6, polyamide 66, polyamide 46 and polyamide 610, among which the polyamide 6 is most preferred because of its highly hydrophilic property.

In other words, the polyamide resin to be used for the inventive hollow fiber membrane is not particularly limited, as long as it can be formed into a fiber. For example, the polyamide resin may be a crosslinked polyamide resin or an uncrosslinked polyamide resin. However, the uncrosslinked polyamide resin is preferred, because the crosslinked polyamide resin is costly. The polyamide resin preferably has a relative viscosity of 2.0 to 4.5. If the relative viscosity is lower than 2.0, a solution prepared by dissolution of the polyamide resin has an excessively low viscosity, making it difficult to form a hollow fiber membrane. If the relative viscosity is higher than 4.5, on the other hand, the solution has an excessively high viscosity, making it difficult to control the phase separation.

The inventive polyamide hollow fiber membrane, which is formed from the polyamide resin described above, is excellent in membrane surface hydrophilicity. As an index of the hydrophilicity, the surface of the inventive polyamide hollow fiber membrane should have a water contact angle of not greater than 80 degrees, preferably not greater than 70 degrees, more preferably not greater than 60 degrees.

The water contact angle is herein determined by causing a droplet of 0.1- to 2.0-μL pure water to gently contact the membrane surface, and measuring an angle defined between the membrane surface and the tangent line of the water droplet at an end point of the water droplet on the membrane surface by means of a contact angle meter. Therefore, the smaller this measurement value, the higher the hydrophilicity.

If the water contact angle is greater than 80 degrees, the membrane is liable to adsorb organic substances such as proteins contained in a liquid yet to be filtered. Therefore, the filtering ability of the membrane is reduced in a shorter period of time due to the fouling of the membrane.

The inventive polyamide hollow fiber membrane should have a water permeability of not less than 100 L/m²·atm·h, preferably not less than 300 L/m²·atm·h, more preferably not less than 500 L/m²·atm·h, as one index of water permeation properties. If the water permeability is less than 100 L/m²·atm·h, the filtering efficiency is disadvantageously reduced.

Figure 3:
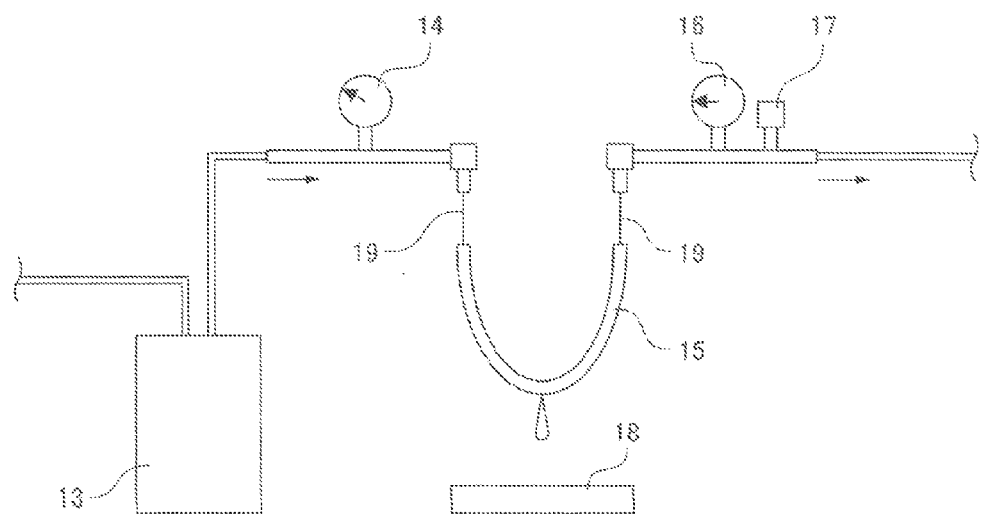
FIG. 3 is a schematic diagram for measuring the water permeability of the hollow fiber membrane.
Figure 4:
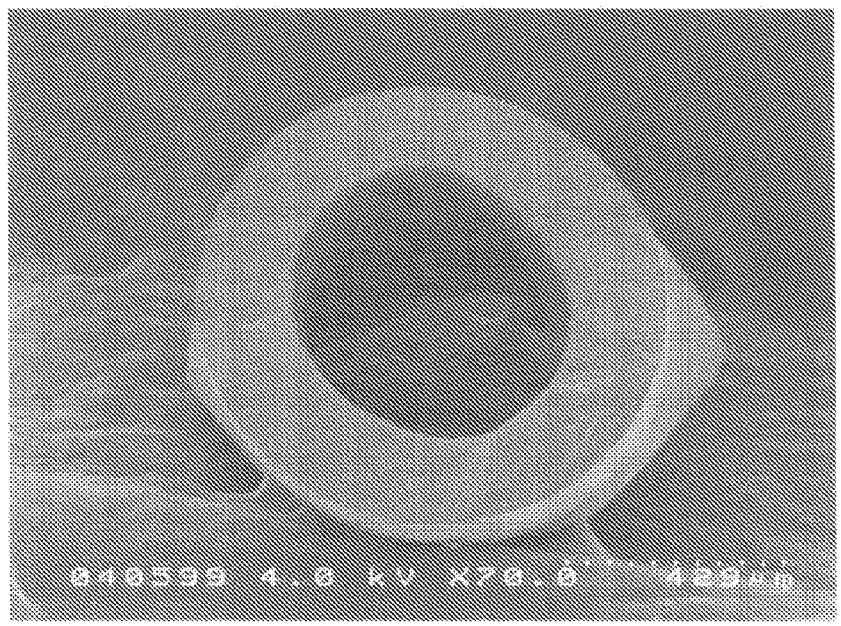
FIG. 4 is a diagram showing an exemplary image of a hollow fiber membrane of Example 1 of the present invention observed by a scanning electron microscope.
Figure 5:
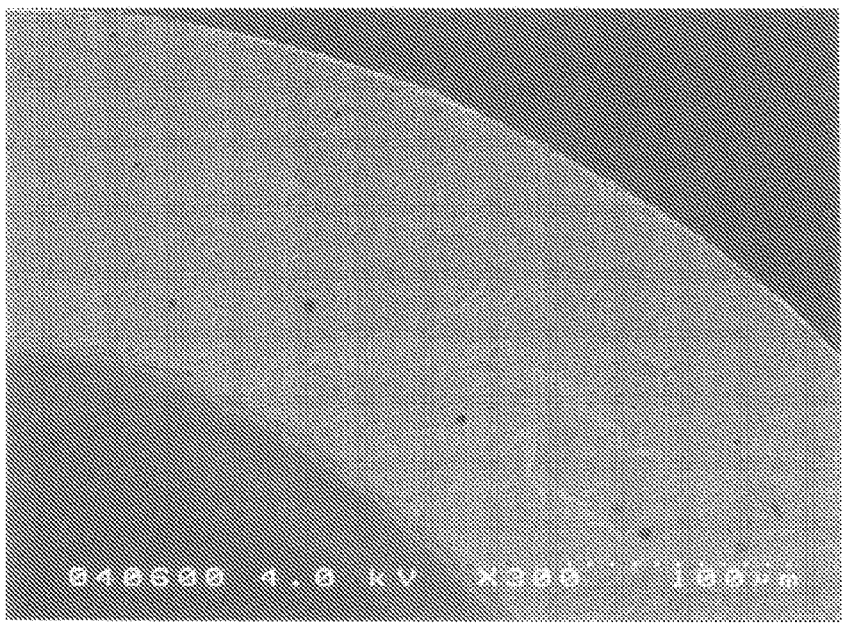
FIG. 5 is a diagram showing a major portion shown in FIG. 4 on a greater scale.
Figure 6:
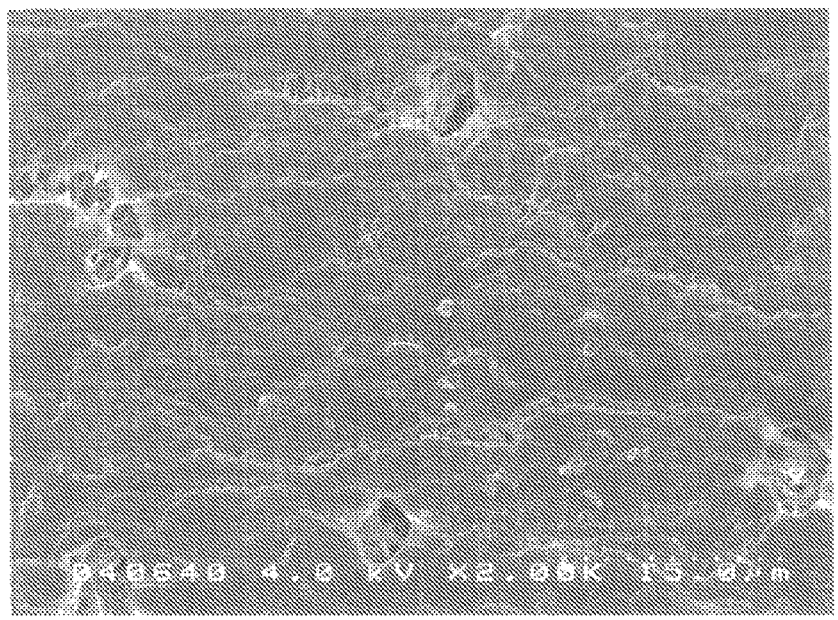
FIG. 6 is a diagram showing an internal surface of the hollow fiber membrane shown in FIG. 4.
Figure 7:
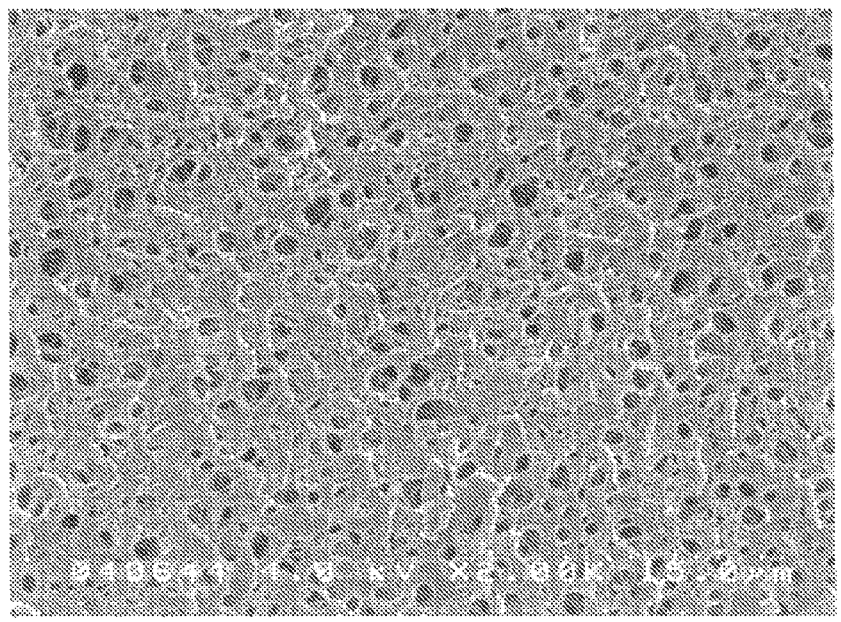
FIG. 7 is a diagram showing an external surface of the hollow fiber membrane shown in FIG. 4.

The water permeability is herein determined by an internal pressure filtration method. More specifically, as shown in FIG. 3, a polyamide hollow fiber membrane 15 is cut to a length of 10 to 20 cm, and injection needles having diameters conformable to the inner diameters of opposite end hollow portions of the hollow fiber membrane are inserted into the opposite end hollow portions. Then, the hollow fiber membrane is set in the illustrated apparatus, and pure water is fed into the hollow fiber membrane for a predetermined period (min) by a liquid feed pump 13. At this time, the amount (L) of water penetrating through the membrane 15 and collected in a receiving tray 18 is measured as a penetration amount, and the water permeability is determined from the following expression:

Water Permeability=Penetration Amount (L)/[Inner Diameter (m)×3.14×Length (m)×{(Inlet Pressure (atm)+Outlet Pressure (atm))/2}×Period (h)]

The inlet pressure is measured by an inlet pressure meter 14 shown in FIG. 3, and the outlet pressure is measured by an outlet pressure meter 16 shown in FIG. 3. In FIG. 3, a reference numeral 17 denotes an outlet valve.

The inventive polyamide hollow fiber membrane has pore size comparable to those of a microfiltration membrane or an ultrafiltration membrane and, therefore, has a 0.1-μm particle rejection percentage of not less than 90%, preferably not less than 95%, more preferably not less than 99%.

In the present invention, the 0.1-μm particle rejection percentage means the percentage of the number of 0.1-μm size particles which can be filtered off by preventing the passage thereof through the hollow fiber membrane. More specifically, 1 mL of 100-nm polystyrene particles 3100A available from Duke Scientific Corporation are added to 299 mL of a 0.1% TritonX-100 aqueous solution, and the resulting mixture is stirred for three hours. The resulting dispersion is passed through the water permeability measuring apparatus shown in FIG. 3. A penetrant liquid penetrating through the membrane is recovered, and the absorbance of the dispersion and the absorbance of the penetrant liquid are measured at 380 nm. Then, the 0.1-μm particle rejection percentage is determined from the following expression:

0.1-μm Particle Rejection Percentage=(Initial Absorbance−Absorbance of Penetrant Liquid)/Initial Absorbance×100

A 0.1-μm particle rejection percentage of less than 90% cannot be employed in the present invention, because substances intended to be filtered off penetrate through a hollow fiber membrane having a 0.1-μm particle rejection percentage of less than 90%.

The inventive hollow fiber membrane preferably has a breaking strength of 1.5 to 30.0 MPa, more preferably 2.5 to 25.0 MPa, further more preferably 3.5 to 15.0 MPa. An excessively low breaking strength is not preferred, because the hollow fiber membrane is difficult to handle, for example, when the membrane is incorporated in a module.

The inventive hollow fiber membrane preferably has a breaking elongation of 10 to 500%, more preferably 20 to 350%, further more preferably 40 to 320%. A hollow fiber membrane having a smaller braking elongation is not preferred, because the hollow fiber membrane is liable to be broken due to a working tension applied thereto during the incorporation thereof in the module, aeration in a membrane bioreactor process (MBR process) or other membrane immersion process, and contact with foreign matter.

The inventive hollow fiber membrane preferably has an elastic modulus of 10.0 to 100.0 MPa, more preferably 15.0 to 80.0 MPa, further more preferably 20.0 to 70.0 MPa. A hollow fiber membrane having an excessively low elastic modulus is not preferred, because the membrane is liable to be deformed due to a working tension applied thereto during the incorporation thereof in the module to have an unstable water permeability and an unstable 0.1-μm particle rejection percentage, resulting in difficulty in handling.

Particularly, where the hollow fiber membrane is used for sewage/waste water treatment in the membrane bioreactor process (MBR process), the hollow fiber membrane should have higher strength, higher elongation and higher elastic modulus, because the hollow fiber membrane is generally constantly vibrated by the aeration to remove deposited substances from the surface thereof during use.

The inventive hollow fiber membrane may contain a filler. The filler is preferably preliminarily dispersed in a resin and/or an organic solvent to be used. The filler to be contained in the hollow fiber membrane effectively improves the strength, the elongation and the elastic modulus of the hollow fiber membrane. The type of the filler to be added is not particularly limited. Examples of the filler include: fibrous fillers such as glass fibers, carbon fibers, potassium titanate whiskers, zinc oxide whiskers, calcium carbonate whiskers, wollastonite whiskers, aluminum borate whiskers, aramide fibers, alumina fibers, silicon carbide fibers, ceramic fibers, asbestos fibers, satin spar fibers and metal fibers; silicates such as talc, hydrotalcite, wollastonite, zeolite, sericite, mica, kaolin, clay, pyrophylite, bentonite, asbestos and alumina silicate; metal compounds such as silica oxide, magnesium oxide, alumina, zirconium oxide, titanium oxide and iron oxide; carbonates such as calcium carbonate, magnesium carbonate and dolomite; sulfates such as calcium sulfate and barium sulfate; hydroxides such as calcium hydroxide, magnesium hydroxide and aluminum hydroxide; and non-fibrous fillers such as glass beads, glass flakes, glass powder, ceramic beads, boron nitride, silicon carbide, carbon black, silica and graphite. Two or more of these fillers may be used in combination. Among the fillers described above, talc, hydrotalcite, silica, clay and titanium oxide are preferred, and talc and clay are more preferred.

The amount of the filler to be added is not particularly limited, but is preferably 5 to 100 mass %, more preferably 10 to 75 mass %, further more preferably 25 to 50 mass %, based on the mass of the resin. If the amount of the filler is less than 5 mass % based on the mass of the resin, it is impossible to expect improvement in strength/elongation property and elastic modulus. If the amount of the filler is greater than 100 mass % based on the mass of the resin, on the other hand, the resulting hollow fiber membrane is disadvantageously brittle.

Next, a method of producing the inventive polyamide hollow fiber membrane will be described.

Since examples of a solvent in which the polyamide resin is soluble at a room temperature merely include formic acid, concentrated sulfuric acid and fluorine-containing solvents, the inventive polyamide hollow fiber membrane is preferably produced through the TIPS process by dissolving the polyamide resin in a solvent at a higher temperature.

For the production of the inventive polyamide hollow fiber membrane, more specifically, a membrane formation dope solution is first prepared by dissolving the polyamide resin, at a temperature of not lower than 100° C., in an organic solvent which has a boiling point of not lower than 150° C. and is insoluble with the polyamide resin at a temperature of lower than 100° C. and soluble with the polyamide resin at a temperature of not lower than 100° C.

The TIPS process is a porous product producing process, in which a homogeneous polymer solution prepared by the dissolution of a polymer at a higher temperature is cooled to a temperature below a binodal curve to induce the phase separation, and the resulting structure is fixed by crystallization or glass transition of the polymer. In the TIPS process, microscopic characteristics such as the microscopic dispersion state of the polyamide resin in the organic solvent to be dissolved with the polyamide resin, the microscopic concentration gradation of the polyamide resin, and the phase separation rate, the crystallization rate and the crystal growth rate in the phase separation process are very important factors, which determine the spinnability, the pore size, the pore size uniformity and the water permeability of the polyamide hollow fiber membrane.

The inventors of the present invention conducted intensive studies to find an organic solvent (other than formic acid, concentrated sulfuric acid and fluorine-containing solvents) suitable for this process. As a result, the inventors found that the inventive polyamide hollow fiber membrane can be produced by selecting an organic solvent which has a boiling point of not lower than 150° C. and is insoluble with the polyamide resin at a temperature of lower than 100° C. and soluble with the polyamide resin at a temperature of not lower than 100° C., extruding the membrane formation dope solution controlled at a temperature of not lower than 100° C. through a spinneret, and then abruptly cooling the extruded membrane formation dope solution in a coagulation bath kept at a temperature of lower than 100° C.

The organic solvent should have a boiling point of not lower than 150° C., preferably not lower than 180° C., further more preferably not lower than 200° C. A reason why the boiling point should be not lower than 150° C. is not clarified but, if the boiling point is lower than 150° C., microscopic variations in the concentration of the polyamide resin in the membrane formation dope solution are liable to occur due to the evaporation of the solvent during the extrusion of the membrane formation dope solution from the spinneret, influencing the microscopic characteristics such as the phase separation rate, the crystallization rate and the crystal growth rate in the phase separation process. This supposedly makes it impossible to provide the inventive polyamide hollow fiber membrane. Further, if the boiling point of the organic solvent is lower than 150° C., the vapor pressure of the solvent is increased during the dissolution of the polyamide resin at a temperature of not lower than 100° C., causing inconvenience in the working environment.

In the inventive polyamide hollow fiber membrane production method, it is necessary to prepare the membrane formation dope solution by dissolving the polyamide resin at a temperature of not lower than 100° C. in the organic solvent insoluble with the polyamide resin at a temperature of lower than 100° C., and extrude the membrane formation dope solution through the spinneret under temperature control at not lower than 100° C. Where an organic solvent soluble with the polyamide resin at a temperature of lower than 100° C. is used, the phase separation of the polyamide resin in the membrane formation dope solution is retarded during the extrusion of the membrane formation dope solution in the coagulation bath controlled at a temperature of lower than 100° C., as will be described later, even with abrupt cooling in the coagulation bath. Therefore, the phase separation rate, the crystallization rate and the crystal growth rate of the polyamide resin are inappropriate for the present invention, making it impossible to provide the inventive polyamide hollow fiber membrane. In the inventive polyamide hollow fiber membrane production method, the microscopic variations in the concentration of the polyamide resin in the membrane formation dope solution are suppressed by extruding the membrane formation dope solution controlled at a temperature of not lower than 100° C. through the spinneret, whereby the phase separation rate, the crystallization rate and the crystal growth rate in the phase separation process can be properly controlled. This supposedly makes it possible to provide the inventive polyamide hollow fiber membrane.

In the inventive polyamide hollow fiber membrane production method, it is necessary to extrude the membrane formation dope solution controlled at a temperature of not lower than 100° C. through the spinneret into the coagulation bath kept at a temperature of lower than 100° C. The membrane formation dope solution is abruptly cooled by thus extruding the membrane formation dope solution controlled at a temperature of not lower than 100° C. through the spinneret into the coagulation bath kept at a temperature of lower than 100° C., whereby the growth of polymer crystals is suppressed in the phase separation process to reduce the size of the crystals. Thus, the hollow fiber membrane is controlled to have smaller pore size. In other words, in order to achieve a 0.1-μm particle rejection percentage of not less than 90%, it is necessary to abruptly cool the membrane formation dope solution from a spinning temperature of not lower than 100° C. by the extrusion of the membrane formation dope solution into the coagulation bath kept at a temperature of lower than 100° C. Even if a membrane formation dope solution controlled at a temperature of lower than 100° C. is extruded through the spinneret, the membrane formation dope solution is gradually cooled in the coagulation bath. Therefore, the polymer crystals grow to a larger size in the phase separation process. As a result, it is impossible to control the pore size of the hollow fiber membrane to a sufficiently small level, failing to achieve a 0.1-μm particle rejection percentage of not less than 90%.

A temperature at which the polyamide resin is dissolved with the organic solvent herein means a temperature at which a mixture having a resin-to-solvent ratio of 20% becomes homogeneous when being visually inspected after being stirred for one hour.

In the present invention, examples of the organic solvent having a boiling point of not lower than 150° C. and insoluble with the polyamide resin at a temperature of lower than 100° C. include aprotic polar solvents, glycol ethers, polyvalent alcohols, organic acids, organic acid esters, and higher alcohols.

Specific examples of the aprotic polar solvents include sulfolane, dimethyl sulfone, dimethyl sulfoxide, γ-butyrolactone, γ-valerolactone, δ-valerolactone, ε-caprolactone, N,N-dimethylformamide, N,N-dimethylacetamide, N-methyl-2-pyrrolidone, ethylene carbonate and propylene carbonate. Specific examples of the glycol ethers include diethylene glycol dimethyl ether, diethylene glycol diethyl ether, triethylene glycol dimethyl ether, diethylene glycol dibutyl ether and tetraethylene glycol dimethyl ether. Specific examples of polyvalent alcohols include glycerin, ethylene glycol, diethylene glycol, triethylene glycol, propylene glycol, hexylene glycol, 1,3-butanediol and polyethylene glycols (having a molecular weight of 100 to 600). Specific examples of the organic acids and the organic acid esters include dimethyl phthalate, diethyl phthalate, diisopropyl phthalate, dibutyl phthalate, butyl benzyl phthalate, methyl salicylate, oleic acid, palmitic acid, stearic acid and lauric acid. Among these, the aprotic polar solvents and the polyvalent alcohols are preferred, and sulfolane, γ-butyrolactone, ε-caprolactone, propylene glycol, hexylene glycol, 1,3-butanediol and polyethylene glycols (having a molecular weight of 100 to 600) are more preferred. Further, sulfolane is most preferred. The use of any of the aprotic polar solvents and the polyvalent alcohols improves the spinnability, and advantageously improves the water permeability and the strength of the hollow fiber membrane. A reason for the improvement is not clarified, but is supposedly as follows. The polyamide resin to be used for the inventive polyamide hollow fiber membrane has a relatively high molar ratio of the amide group to the methylene group, so that a molecule of the polyamide resin has a relatively high polarity. Therefore, the polyamide resin is highly soluble with any of the aprotic polar solvents and the polyvalent alcohols each having a higher polarity, particularly with the sulfolane and, therefore, is homogeneously soluble in any of the aprotic polar solvents and the polyvalent alcohols. In addition, the polyamide resin has higher affinity for water. Therefore, where water is used for the coagulation bath, for example, the solvent in the membrane formation dope solution is properly replaced with water in the coagulation bath, thereby accelerating the crystallization. As a result, the hollow fiber membrane is supposedly improved in water permeability and strength.

The organic solvents described above may be used either alone or as a mixture prepared by mixing two or more thereof. Even if a single organic solvent is used, a sufficient effect can be created. Where two or more organic solvents are used as a solvent mixture, the hollow fiber membrane can be advantageously produced as having an effective feature, because phase separation order and a structure resulting from the phase separation vary depending on the organic solvents. Where a polyethylene glycol having a higher phase separation temperature is used for the solvent mixture, for example, the polyethylene glycol is first separated to provide a pore forming effect. Further, where sulfolane which causes liquid-liquid separation is used for the solvent mixture, for example, the hollow fiber membrane can have a sponge-like structure improved in strength/elongation property.

The concentration of the polyamide resin dissolved in the organic solvent is preferably 5 mass % to 50 mass %, more preferably 10 mass % to 40 mass %, most preferably 15 mass % to 30 mass %. If the concentration of the resin is lower than 5 mass %, the membrane is liable to have a significantly reduced strength and a reduced particle rejection percentage. If the concentration of the resin is higher than 50 mass %, on the other hand, the water permeability is liable to be reduced.

When the polyamide resin is dissolved in the organic solvent, it is necessary to maintain the solvent at a temperature of not lower than 100° C. as described above. More specifically, it is preferred to dissolve the polyamide resin in the solvent while maintaining the solvent at a temperature that is higher than the phase separation temperature of the system by 10° C. to 50° C., more preferably 20° C. to 40° C. The phase separation temperature of the system herein means a temperature at which the liquid-liquid phase separation or the solid-liquid phase separation due to deposition of the crystals is caused by gradually cooling a mixture prepared by mixing the resin and the solvent at a sufficiently high temperature. The phase separation temperature can be properly measured with the use of a microscope having a hot stage.

In the subsequent step for the production, the membrane formation dope solution prepared by dissolving the polyamide resin in the organic solvent in the aforementioned manner is extruded into the coagulation liquid kept at a temperature of lower than 100° C. with the use of the hollow fiber spinneret, whereby a hollow fiber is formed. The phase separation is caused by abruptly cooling the membrane formation dope solution to the predetermined coagulation liquid temperature. Thus, a porous structure is formed. Where water is used as the coagulation liquid and desired to be kept at a cooling temperature of 0° C. or lower, a salt may be added to the water, or ethylene glycol, glycerin or the like may be mixed with the water.

A tube in orifice type spinneret to be generally used for formation of a sheath-core composite filament by melt-spinning may be used as the hollow fiber spinneret.

A fluid is injected into a core portion which later defines a hollow portion. The fluid to be injected may be a liquid or a gas. Particularly, it is preferred to use the liquid to permit the spinning even under difficult spinning conditions such that the membrane formation dope solution has a lower viscosity. The liquid to be used may be properly selected. Where it is desired to form a larger pore size in the inner surface of the hollow fiber, a good solvent having higher affinity for the polyamide resin may be used. Where it is desired to form a smaller pore size in the inner surface of the hollow fiber, a poor solvent may be used. Specific examples of the good solvent include glycerin, diethylene glycol, triethylene glycol and sulfolane. Examples of the poor solvent include higher fatty acids, liquid paraffin and other fluids, which each have a higher boiling point and are insoluble with the polyamide. Where the membrane formation dope solution has higher viscosity and excellent spinnability, a gas such as an inert gas may be injected into the core portion.

Any liquid may be used as the coagulation liquid, as long as the effects of the present invention are not impaired. Preferred examples of the coagulation liquid include water, alcohols such as ethanol and isopropanol, polyvalent alcohols such as glycerin, ethylene glycol, diethylene glycol and triethylene glycol, and ketones such as acetone and ethyl methyl ketone, which may be used either alone or as a solvent mixture prepared by mixing two or more thereof. Among these, water, glycerin and ethylene glycol are preferred, and water is more preferred. The temperature of the coagulation liquid is not particularly limited, but preferably −20° C. to 100° C., more preferably −10° C. to 80° C., most preferably 0° C. to 50° C. By changing the temperature of the coagulation liquid, the crystallization rate of the polyamide resin can be changed and, therefore, the pore size, the water permeability and the strength of the hollow fiber membrane can be changed. In general, if the temperature of the coagulation liquid is lower, a smaller pore size, a lower water permeability and an improved strength will result. If the temperature of the coagulation liquid is higher, a greater pore size, an improved water permeability and a lower strength will result. However, these characteristic properties are also changed by the solubility of the used solvent in the coagulation liquid and the crystallization rate of the polyamide resin per se. Therefore, there are many exceptions. If the temperature of the coagulation liquid is lower than −20° C., great energy is disadvantageously required for temperature control. If the temperature of the coagulation liquid is higher than 100° C., on the other hand, the resulting hollow fiber membrane disadvantageously has a lower strength.

In the subsequent step, the resulting hollow fiber is immersed in an extraction solvent, whereby the organic solvent phase-separated in the hollow fiber is extracted away. Thus, the hollow fiber membrane is finally provided. The extraction solvent is preferably an inexpensive solvent having a lower boiling point and permitting easy separation thereof based on a difference in boiling point between the extraction solvent and the organic solvent after the extraction. Examples of the extraction solvent include water, glycerin, methanol, ethanol, isopropanol, acetone, diethyl ether, hexane, petroleum ether and toluene, among which water, methanol, ethanol, isopropanol and acetone are preferred, and water, methanol and isopropanol are particularly preferred. Particularly, where the organic solvent to be extracted is soluble in water, a water bath may be used in the aforementioned cooling step. This is efficient, because the extraction of the organic solvent can be simultaneously achieved in the cooling step. Where the organic solvent to be extracted is a water-insoluble solvent such as a phthalate or a fatty acid, the extraction solvent is preferably isopropyl alcohol, petroleum ether or the like. A period during which the hollow fiber is immersed in the extraction solvent is not particularly limited, as long as the effects of the invention are not impaired. The immersing period is typically one hour to two months, preferably five hours to one month, more preferably ten hours to 14 days. For effective extraction and removal of the organic solvent, the extraction solvent may be replaced or stirred. Particularly, where the hollow fiber membrane is used in the food industry or in a water purification facility, the solvent extraction/removal process should be thoroughly performed for a longer period of time, because the residue of the organic solvent is problematic.

Figure 1:
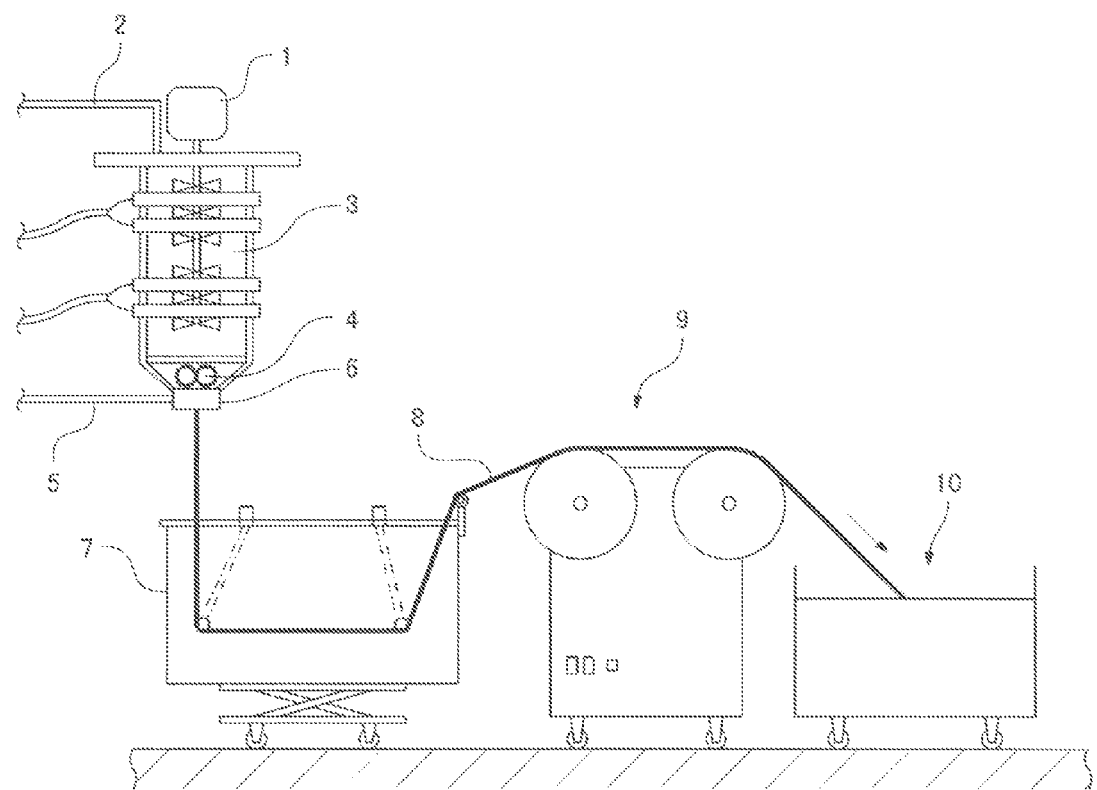
FIG. 1 is a schematic diagram of an exemplary apparatus for producing an inventive hollow fiber membrane.
Figure 2:
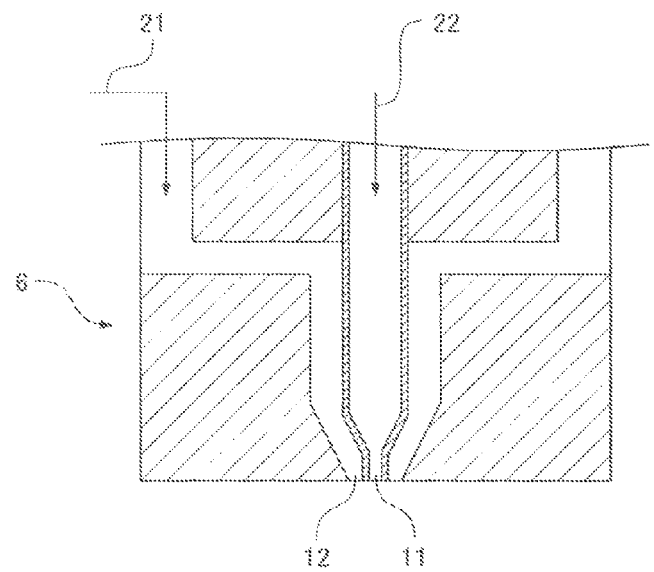
FIG. 2 is a diagram illustrating a spinneret shown in FIG. 1.

A common dry/wet spinning apparatus as shown in FIG. 1 may be used in a preferred embodiment of the inventive polyamide hollow fiber membrane production method described above. A spinneret having a double circular shape as shown in FIG. 2 can be used for the production of the hollow fiber.

In FIG. 1, there are shown a container 3, a coagulation bath 7, a winding device 9 and a solvent extraction bath 10. A membrane formation dope solution prepared by dissolving the polyamide resin in the organic solvent at a temperature of not lower than 100° C. is contained in the container 3. A metering pump 4 and a spinneret 6 are provided at the bottom of the container 3. The spinneret 6 has a sectional structure as shown in FIG. 2. More specifically, the spinneret 6 has an internal fluid outlet port 11 provided at the center thereof and having a round cross section, and an annular membrane formation dope solution outlet port 12 provided around the internal fluid outlet port 11 coaxially with the internal fluid outlet port 11. The membrane formation dope solution 21 is fed to the membrane formation dope solution outlet port 12 from the inside of the container 3 through the metering pump 4. An internal fluid 22 is fed to the internal fluid outlet port 11 from an inlet passage 5 shown in FIG. 1 through another metering pump not shown. In FIG. 1, there is also shown a stirring motor 1 provided in the container 3, and a pressurized gas feed passage 2 communicating with the inside of the container 3.

With this arrangement, the polyamide resin is mixed with and dissolved in the organic solvent at the higher temperature as described above, and the resulting membrane formation dope solution is contained in the container 3. The membrane formation dope solution 21 and the internal fluid 22 are metered by the respective metering pumps, and fed into the spinneret 6. The membrane formation dope solution extruded from the spinneret 6 is introduced through a minute air gap into the coagulation bath 7 containing a liquid such as water in which the polyamide resin is substantially insoluble, and cooled to be solidified. Thus, a hollow fiber 8 is produced. At this time, thermally-induced phase separation occurs during the cooling and solidification of the membrane formation dope solution, so that a wall portion of the hollow fiber 8 has a sea-island structure. The hollow fiber 8 thus produced is once wound up by the winding device 9, and then fed into the solvent extraction bath 10. While the hollow fiber 8 is immersed in the solvent extraction bath 10 for a predetermined period, an island component of the organic solvent of the sea-island structure and the fluid injected into the hollow portion during the spinning are removed with the use of the extraction solvent such as water. Thus, the intended hollow fiber membrane is produced. Then, the hollow fiber membrane is taken out of the solvent extraction bath 10.

EXAMPLES

The present invention will hereinafter be described more specifically by way of examples thereof. However, the present invention is not limited to these examples. The characteristic properties of a hollow fiber membrane of each of the following examples and comparative examples were measured in the aforementioned manner. The contact angle was measured with the use of an automatic contact angle meter DM-500 available from Kyowa Interface Science Co., Ltd. The breaking strength, the breaking elongation and the elastic modulus of the hollow fiber membrane were measured in the following manner. The measurement was performed in conformity with JIS L-1013 by stretching the hollow fiber membrane at a rate of 50 mm/min with a chuck distance of 50 mm with the use of a tensile tester AUTOGRAPH AG-H available from Shimadzu Corporation.

Example 1

First, 80 g of polyamide-6 chips (A1030BRT available from Unitika Ltd. and having a relative viscosity of 3.53 (as measured at a concentration of 1 g/dL at a temperature of 25° C. by using 96% sulfuric acid as a solvent)) and 320 g of sulfolane (available from Tokyo Chemical Industry Co., Ltd. and having a boiling point of 285° C.) were stirred at 230° C. for 1.5 hours, whereby the polyamide-6 chips were dissolved in sulfolane to prepare a membrane formation dope solution. Thereafter, the membrane formation dope solution was cooled to a temperature of 210° C., and fed to the spinneret 6 through the metering pump 4 in the apparatus shown in FIG. 1 and extruded at 0.05 MPa. The annular membrane formation dope solution outlet port of the spinneret herein used had an outer diameter of 1.58 mm and an inner diameter of 0.83 mm. Triethylene glycol was fed at a feed rate of 6.0 g/min as an internal liquid for spinning a hollow fiber. The spinning dope solution thus extruded was introduced into a 0° C. water bath (coagulation bath 7) via an air gap of 5 mm to be cooled and solidified, and then the resulting hollow fiber was wound up at a winding rate of 20 m/min by the winding device 9. Further, the hollow fiber was immersed in water contained in the solvent extraction bath 10 for 24 hours, whereby the solvent was extracted from the hollow fiber. Thus, a hollow fiber membrane was produced.

The hollow fiber membrane thus produced had a contact angle of 52 degrees, a water permeability of 830 L/m$^2$·atm·h, a 0.1-μm particle rejection percentage of 99%, a breaking strength of 4.5 MPa, a breaking elongation of 296% and an elastic modulus of 19.0 MPa. Images of sections of the hollow fiber membrane observed by an electron microscope are shown in FIGS. 4 to 7. As shown, the hollow fiber membrane had pores densely arranged and having uniform pore sizes in the absence of macro-voids. Further, multiple pores were observed on the inner surface and the outer surface of the hollow fiber membrane. Detailed information on the hollow fiber membrane of Example 1 is shown in Table 1.

TABLE 1

|  | Example | | | | | |
|---|---|---|---|---|---|---|
|  | 1 | 2 | 3 | 4 | 5 | 6 |
| Polyamide | | | | | | |
| Type | PA6 | PA6 | PA6 | PA6 | PA6 | PA6 |
| —$CH_2$—:—NHCO— | 5:1 | 5:1 | 5:1 | 5:1 | 5:1 | 5:1 |
| Relative viscosity | 3.53 | 3.53 | 3.53 | 2.51 | 3.53 | 3.53 |
| Use amount | 80 g | 80 g | 100 g | 80 g | 80 g | 100 g |
| Organic solvent | | | | | | |
| Type | Sulfolane | Sulfolane | Sulfolane | Sulfolane | Sulfolane | Sulfolane |
| Boiling point | 285° C. | 285° C. | 285° C. | 285° C. | 285° C. | 285° C. |
| Use amount | 320 g | 320 g | 300 g | 320 g | 320 g | 300 g |
| Spinning temperature | 210° C. | 210° C. | 210° C. | 210° C. | 210° C. | 210° C. |
| Coagulation bath | | | | | | |
| Type | Water | Water | Water | Water | Water | Water |
| Temperature | 0° C. | 0° C. | 0° C. | 0° C. | 0° C. | 0° C. |
| Internal liquid | TEG | Sulfolane | TEG | TEG | TEG | TEG |
| Stretching temperature | — | — | — | — | 40° C. | 40° C. |
| Contact angle (degree) | 52 | 52 | 55 | 50 | 52 | 52 |
| Water permeability ($L/m^2 \cdot atm \cdot h$) | 830 | 130 | 287 | 157 | 1627 | 971 |
| Rejection percentage (%) | 99 | 99 | 100 | 99 | 95 | 98 |
| Breaking strength (MPa) | 4.5 | 5.3 | 8.0 | 4.2 | 12.2 | 17.1 |
| Breaking elongation (%) | 296 | 304 | 329 | 287 | 100 | 121 |
| Elastic modulus (MPa) | 19.0 | 23.4 | 32.1 | 24.7 | 20.3 | 34.9 |

|  | Example | | | | | |
|---|---|---|---|---|---|---|
|  | 7 | 8 | 9 | 10 | 11 | 12 |
| Polyamide | | | | | | |
| Type | PA6 | PA6 | PA6 | PA6 | PA6 | PA6 |
| —$CH_2$—:—NHCO— | 5:1 | 5:1 | 5:1 | 5:1 | 5:1 | 5:1 |
| Relative viscosity | 3.53 | 3.53 | 3.53 | 3.53 | 3.53 | 3.53 |
| Use amount | 120 g | 80 g | 80 g | 100 g | 80 g | 80 g |
| Organic solvent | | | | | | |
| Type | Sulfolane | γ-BL | Propylene carbonate | NMP | ε-Caprolactone | Sulfolane, PEG400 |
| Boiling point | 285° C. | 203° C. | 242° C. | 202° C. | 235° C. | 285° C. |
| Use amount | 280 g | 320 g | 320 g | 300 g | 320 g | 320 g |
| Spinning temperature | 210° C. | 190° C. | 200° C. | 180° C. | 200° C. | 210° C. |
| Coagulation bath | | | | | | |
| Type | Water | Water | Water | Water | Water | Water |
| Temperature | 0° C. | 0° C. | 0° C. | 0° C. | 0° C. | 0° C. |
| Internal liquid | TEG | TEG | TEG | TEG | TEG | TEG |
| Stretching temperature | 40° C. | — | — | — | — | — |
| Contact angle (degree) | 51 | 52 | 52 | 51 | 51 | 52 |
| Water permeability ($L/m^2 \cdot atm \cdot h$) | 163 | 540 | 795 | 103 | 575 | 1026 |
| Rejection percentage (%) | 100 | 100 | 100 | 99 | 100 | 98 |
| Breaking strength (MPa) | 24.9 | 5.5 | 6.8 | 2.1 | 4.4 | 3.2 |
| Breaking elongation (%) | 132 | 288 | 308 | 53 | 178 | 85 |
| Elastic modulus (MPa) | 45.6 | 38.7 | 43.3 | 20.6 | 30.1 | 41.8 |

|  | Example | | | | | Comparative Example | |
|---|---|---|---|---|---|---|---|
|  | 13 | 14 | 15 | 16 | 17 | 1 | 2 |
| Polyamide | | | | | | | |
| Type | PA66 | PA610 | PA6 | PA6 | PA6 | PA12 | PA6 |
| —$CH_2$—:—NHCO— | 5:1 | 7:1 | 5:1 | 5:1 | 5:1 | 11:1 | 5:1 |
| Relative viscosity | — | — | 3.53 | 3.53 | 3.53 | 2.25 | 3.53 |
| Use amount | 80 g | 80 g | 120 g | 120 g | 80 g | 80 g | 80 g |
| Organic solvent | | | | | | | |
| Type | Sulfolane | Sulfolane | PG, PEG200 | PG, PEG200, Talc | Sulfolane | γ-BL | Sulfolane |
| Boiling point | 285° C. | 285° C. | 187° C. | 187° C. | 285° C. | 203° C. | 285° C. |
| Use amount | 320 g | 320 g | 280 g | 280 g | 320 g | 320 g | 320 g |
| Spinning temperature | 250° C. | 210° C. | 170° C. | 170° C. | 210° C. | 180° C. | 210° C. |

TABLE 1-continued

| | Coagulation bath | | | | | | |
|---|---|---|---|---|---|---|---|
| Type | Water | Water | Water | Water | EG | Water | EG |
| Temperature | 0° C. | 0° C. | 0° C. | 0° C. | 0° C. | 0° C. | 110° C. |
| Internal liquid | TEG | TEG | PG | PG | TEG | γ-BL | TEG |
| Stretching temperature | — | — | — | — | — | — | — |
| Contact angle (degree) | 53 | 66 | 50 | 53 | 51 | 95 | 51 |
| Water permeability (L/m²·atm·h) | 109 | 520 | 250 | 130 | 1102 | 120 | 1521 |
| Rejection percentage (%) | 100 | 100 | 100 | 100 | 98 | 100 | 68 |
| Breaking strength (MPa) | 2.5 | 6.1 | 2.1 | 4.0 | 4.2 | 7.0 | 1.8 |
| Breaking elongation (%) | 52 | 257 | 38 | 115 | 269 | 301 | 105 |
| Elastic modulus (MPa) | 33.8 | 53.1 | 54.8 | 72.5 | 20.5 | 52.1 | 18.7 |

PA6: Polyamide 6,
PA66: Polyamide 66,
PA610: Polyamide 610,
PA12: Polyamide 12,
γ-BL: γ-Butyrolactone,
NMP: N-methyl-2-pyrrolidone,
PEG400: Polyethylene glycol (Mw: 400),
PG: Propylene glycol,
PEG200: Polyethylene glycol (Mw: 200),
TEG: Triethylene glycol,
EG: Ethylene glycol

Example 2

A hollow fiber membrane was produced in substantially the same manner as in Example 1, except that sulfolane was used as the internal liquid. The hollow fiber membrane thus produced had a contact angle of 52 degrees, a water permeability of 130 L/m²·atm·h, a 0.1-μm particle rejection percentage of 99%, a breaking strength of 5.3 MPa, a breaking elongation of 304% and an elastic modulus of 23.4 MPa. Detailed information on the hollow fiber membrane of Example 2 is shown in Table 1.

Example 3

A hollow fiber membrane was produced in substantially the same manner as in Example 1, except that the polyamide-6 chips were used in an amount of 100 g and sulfolane was used in an amount of 300 g. The hollow fiber membrane thus produced had a contact angle of 55 degrees, a water permeability of 287 L/m²·atm·h, a 0.1-μm particle rejection percentage of 100%, a breaking strength of 8.0 MPa, a breaking elongation of 329% and an elastic modulus of 32.1 MPa. Detailed information on the hollow fiber membrane of Example 3 is shown in Table 1.

Example 4

A hollow fiber membrane was produced in substantially the same manner as in Example 1, except that A1030BRL available from Unitika Ltd. (polyamide 6 having a relative viscosity of 2.51 (as measured at a concentration of 1 g/dL at a temperature of 25° C. by using 96% sulfuric acid as a solvent)) was used as the polyamide. The hollow fiber membrane thus produced had a contact angle of 50 degrees, a water permeability of 157 L/m²·atm·h, a 0.1-μm particle rejection percentage of 99%, a breaking strength of 4.2 MPa, a breaking elongation of 287% and an elastic modulus of 24.7 MPa. Detailed information on the hollow fiber membrane of Example 4 is shown in Table 1.

Example 5

The hollow fiber membrane of Example 1 was stretched to twice the original length at 40° C. The resulting hollow fiber membrane had a contact angle of 52 degrees, a water permeability of 1627 L/m²·atm·h, a 0.1-μm particle rejection percentage of 95%, a breaking strength of 12.2 MPa, a breaking elongation of 100% and an elastic modulus of 20.3 MPa. Detailed information on the hollow fiber membrane of Example 5 is shown in Table 1.

Example 6

The hollow fiber membrane of Example 3 was stretched to twice the original length at 40° C. The resulting hollow fiber membrane had a contact angle of 52 degrees, a water permeability of 971 L/m²·atm·h, a 0.1-μm particle rejection percentage of 98%, a breaking strength of 17.1 MPa, a breaking elongation of 121% and an elastic modulus of 34.9 MPa. Detailed information on the hollow fiber membrane of Example 6 is shown in Table 1.

Example 7

A hollow fiber membrane was produced in substantially the same manner as in Example 1, except that the polyamide-6 chips were used in an amount of 120 g and sulfolane was used in an amount of 280 g. Then, the hollow fiber membrane thus produced was stretched to twice the original length at 40° C. The resulting hollow fiber membrane had a contact angle of 51 degrees, a water permeability of 163 L/m²·atm·h, a 0.1-μm particle rejection percentage of 100%, a breaking strength of 24.9 MPa, a breaking elongation of 132% and an elastic modulus of 45.6 MPa. Detailed information on the hollow fiber membrane of Example 7 is shown in Table 1.

Example 8

A hollow fiber membrane was produced in substantially the same manner as in Example 1, except that γ-butyrolactone (available from Wako Pure Chemical Industries, Ltd. and having a boiling point of 203° C.) was used as the solvent, and a stirring/dissolving temperature of 190° C., a stirring/dissolving period of 2.5 hours and a spinning temperature of 190° C. were employed. The hollow fiber membrane thus produced had a contact angle of 52 degrees, a water permeability of 540 L/m²·atm·h, a 0.1-μm particle rejection percentage of 100%, a breaking strength of 5.5 MPa, a breaking elongation of 288% and an elastic modulus of 38.7 MPa. Detailed information on the hollow fiber membrane of Example 8 is shown in Table 1.

Example 9

A hollow fiber membrane was produced in substantially the same manner as in Example 1, except that propylene carbonate (available from Nacalai Tesque, Inc. and having a boiling point of 242° C.) was used as the solvent, and a stirring/dissolving temperature of 200° C., a stirring/dissolving period of 2.5 hours and a spinning temperature of 200° C. were employed. The hollow fiber membrane thus produced had a contact angle of 52 degrees, a water permeability of 795 L/m$^2$·atm·h, a 0.1-μm particle rejection percentage of 100%, a breaking strength of 6.8 MPa, a breaking elongation of 308% and an elastic modulus of 43.3 MPa. Detailed information on the hollow fiber membrane of Example 9 is shown in Table 1.

Example 10

A hollow fiber membrane was produced in substantially the same manner as in Example 1, except that the polyamide-6 resin was used in an amount of 100 g, N-methyl-2-pyrrolidone (available from Nacalai Tesque, Inc. and having a boiling point of 202° C.) was used in an amount of 300 g as the solvent, and a dissolving temperature of 180° C. and an extrusion temperature of 180° C. were employed. The hollow fiber membrane thus produced had a contact angle of 51 degrees, a water permeability of 103 L/m$^2$·atm·h, a 0.1-μm particle rejection percentage of 99%, a breaking strength of 2.1 MPa, a breaking elongation of 53% and an elastic modulus of 20.6 MPa. Detailed information on the hollow fiber membrane of Example 10 is shown in Table 1.

Example 11

A hollow fiber membrane was produced in substantially the same manner as in Example 1, except that ε-caprolactone (available from Wako Pure Chemical Industries, Ltd. and having a boiling point of 235° C.) was used as the solvent, and a stirring/dissolving temperature of 200° C., a stirring period of 2.5 hours and a spinning temperature of 200° C. were employed. The hollow fiber membrane thus produced had a contact angle of 51 degrees, a water permeability of 575 L/m$^2$·atm·h, a 0.1-μm particle rejection percentage of 100%, a breaking strength of 4.4 MPa, a breaking elongation of 178% and an elastic modulus of 30.1 MPa. Detailed information on the hollow fiber membrane of Example 11 is shown in Table 1.

Example 12

A hollow fiber membrane was produced in substantially the same manner as in Example 1, except that a liquid mixture (boiling point: 285° C.) containing 200 g of sulfolane and 120 g of polyethylene glycol (available from Dai-Ichi Kogyo Seiyaku Co., Ltd. and having a molecular weight of 400) was used as the solvent. The hollow fiber membrane thus produced had a contact angle of 52 degrees, a water permeability of 1026 L/m$^2$·atm·h, a 0.1-μm particle rejection percentage of 98%, a breaking strength of 3.2 MPa, a breaking elongation of 85% and an elastic modulus of 41.8 MPa. Detailed information on the hollow fiber membrane of Example 12 is shown in Table 1.

Example 13

A hollow fiber membrane was produced in substantially the same manner as in Example 1, except that polyamide 66 (UBE nylon 2020B available from Ube Industries, Ltd.) was used as the resin, and a dissolving temperature of 250° C. and a spinning temperature of 250° C. were employed. The hollow fiber membrane thus produced had a contact angle of 53 degrees, a water permeability of 109 L/m$^2$·atm·h, a 0.1-μm particle rejection percentage of 100%, a breaking strength of 2.5 MPa, a breaking elongation of 52% and an elastic modulus of 33.8 MPa. Detailed information on the hollow fiber membrane of Example 13 is shown in Table 1.

Example 14

A hollow fiber membrane was produced in substantially the same manner as in Example 1, except that polyamide 610 (CM2001 available from Toray Industries, Inc.) was used as the resin, and a dissolving temperature of 210° C. and a spinning temperature of 210° C. were employed. The hollow fiber membrane thus produced had a contact angle of 66 degrees, a water permeability of 520 L/m$^2$·atm·h, a 0.1-μm particle rejection percentage of 100%, a breaking strength of 6.1 MPa, a breaking elongation of 257% and an elastic modulus of 53.1 MPa. Detailed information on the hollow fiber membrane of Example 14 is shown in Table 1.

Example 15

A hollow fiber membrane was produced in substantially the same manner as in Example 1, except that the polyamide-6 resin was used in an amount of 120 g, a liquid mixture (boiling point: 187° C.) containing 160 g of propylene glycol (available from Adeka Corporation) and 120 g of polyethylene glycol (available from Dai-Ichi Kogyo Seiyaku Co., Ltd. and having a molecular weight of 200) was used as the solvent, a dissolving temperature of 175° C. and a spinning temperature of 170° C. were employed, and propylene glycol was used as the internal liquid for the spinning of the hollow fiber. The hollow fiber membrane thus produced had a contact angle of 50 degrees, a water permeability of 250 L/m$^2$·atm·h, a 0.1-μm particle rejection percentage of 100%, a breaking strength of 2.1 MPa, a breaking elongation of 38% and an elastic modulus of 54.8 MPa. Detailed information on the hollow fiber membrane of Example 15 is shown in Table 1.

Example 16

A hollow fiber membrane was produced in substantially the same manner as in Example 15, except that 40 g of talc (SG2000 available from Nippon Talc Co., Ltd. and having an average particle size of 1.0 μm) was dispersed in the solvent with stirring. The hollow fiber membrane thus produced had a contact angle of 53 degrees, a water permeability of 130 L/m$^2$·atm·h, a 0.1-μm particle rejection percentage of 100%, a breaking strength of 4.0 MPa, a breaking elongation of 115% and an elastic modulus of 72.5 MPa. The hollow fiber membrane of Example 16 was improved in strength/elongation property and elastic modulus over the hollow fiber membrane of Example 9. Detailed information on the hollow fiber membrane of Example 16 is shown in Table 1.

Example 17

A hollow fiber membrane was produced in substantially the same manner as in Example 1, except that ethylene glycol kept at 0° C. was used for the coagulation bath. The hollow fiber membrane thus produced had a contact angle of 51 degrees, a water permeability of 1102 L/m²·atm·h, a 0.1-μm particle rejection percentage of 98%, a breaking strength of 4.2 MPa, a breaking elongation of 269% and an elastic modulus of 20.5 MPa. The hollow fiber membrane of Example 17 was improved in water permeability over the hollow fiber membrane of Example 1. Detailed information on the hollow fiber membrane of Example 17 is shown in Table 1.

Comparative Example 1

First, 80 g of polyamide-12 chips (Rilsan AECNOTL available from Arkema Inc. and having a relative viscosity of 2.25 (as measured at a concentration of 1 g/dL at a temperature of 25° C. by using 96% sulfuric acid as a solvent)) and 320 g of γ-butyrolactone (available from Wako Pure Chemical Industries, Ltd.) were stirred at 190° C. for 1.5 hours, whereby the polyamide-12 chips were dissolved in γ-butyrolactone to prepare a membrane formation dope solution. Thereafter, the membrane formation dope solution was cooled to a temperature of 180° C., and extruded through the spinneret 6 as in Example 1. γ-Butyrolactone was also used as the internal liquid for spinning a hollow fiber, and was fed at a feed rate of 6.0 g/min. The membrane formation dope solution thus extruded was introduced into a 0° C. water bath via an air gap of 5 mm to be cooled and solidified, and then the resulting hollow fiber was wound up at a winding rate of 20 m/min. Further, the hollow fiber was immersed in water for 24 hours, whereby the solvent was extracted from the hollow fiber. Thus, a hollow fiber membrane was produced.

The hollow fiber membrane thus produced had a contact angle of 95 degrees, a water permeability of 120 L/m²·atm·h, a 0.1-μm particle rejection percentage of 100%, a breaking strength of 7.0 MPa, a breaking elongation of 301% and an elastic modulus of 52.1 MPa. Detailed information on the hollow fiber membrane of Comparative Example 1 is shown in Table 1.

Comparative Example 2

A hollow fiber membrane was produced in substantially the same manner as in Example 17, except that ethylene glycol kept at 110° C. was used for the coagulation bath. The hollow fiber membrane thus produced had a contact angle of 51 degrees, a water permeability of 1521 L/m²·atm·h, a 0.1-μm particle rejection percentage of 68%, a breaking strength of 1.8 MPa, a breaking elongation of 105% and an elastic modulus of 18.7 MPa.

As shown in Table 1, Examples 1 to 17 were excellent in contact angle, water permeability and 0.1-μm particle rejection percentage. In contrast, Comparative Example 1, in which polyamide 12 used as the polyamide resin was not hydrophilic, had a contact angle of 95 degrees, which fell outside the range specified by the present invention. Comparative Example 2, in which crystals significantly grew due to a lower cooling rate in the coagulation bath, had a 0.1-μm particle rejection percentage of 68%, which fell outside the range specified by the present invention.

Other Comparative Examples

Use of 1-propanol (boiling point: 97° C.), isopropanol (boiling point: 82° C.), n-butanol (boiling point: 117° C.), tetrahydrofuran (boiling point: 66° C.), chloroform (boiling point: 62° C.), acetone (boiling point: 57° C.), methyl ethyl ketone (boiling point: 80° C.), methyl isobutyl ketone (boiling point: 116° C.), hexane (boiling point: 69° C.), toluene (boiling point: 111° C.), cyclohexane (boiling point: 81° C.), pyridine (boiling point: 115° C.) and ethyl acetate (boiling point: 77° C.) as the solvent for dissolving polyamide 6 was considered. However, the boiling points of these solvents were too low to dissolve the polyamide 6. Therefore, the polyamide 6 was not homogeneously dissolved in any of the solvents even with stirring at a temperature lower by 5° C. than the boiling point.

The invention claimed is:

1. A polyamide hollow fiber membrane production method comprising:
   preparing a membrane formation dope solution by dissolving a polyamide resin in an organic solvent at a temperature of not lower than 100° C., the organic solvent having a boiling point of not lower than 150° C. and being insoluble with the polyamide resin at a temperature lower than 100° C.;
   extruding the membrane formation dope solution controlled at a temperature of not lower than 100° C. through a hollow fiber spinneret into a coagulation liquid kept at a temperature of lower than 100° C. to form a hollow fiber; and
   immersing the hollow fiber in another solvent to remove the organic solvent to form a hollow fiber membrane.

2. A polyamide hollow fiber membrane production method as set forth in claim 1, further comprising the step of using an aprotic polar solvent as the organic solvent.

3. A polyamide hollow fiber membrane production method as set forth in claim 2, further comprising the step of using sulfolane as the aprotic polar solvent.

4. A polyamide hollow fiber membrane production method as set forth in claim 1, further comprising the step of using a polyvalent alcohol as the organic solvent.

5. A polyamide hollow fiber membrane production method as set forth in claim 4, further comprising the step of using at least one solvent selected from propylene glycol, butanediol and polyethylene glycol as the polyvalent alcohol.

6. A polyamide hollow fiber membrane obtained by the method of claim 1, the polyamide hollow fiber member comprising a polyamide resin containing a methylene group and an amide group in a molar ratio of —$CH_2$—:—NHCO—=4:1 to 10:1, the hollow fiber membrane having a membrane surface having a water contact angle of not greater than 80 degrees, the hollow fiber membrane having a water permeability of not less than 100 L/m²·atm·h and a 0.1 μm particle rejection percentage of not less than 90%.

7. A polyamide hollow fiber membrane as set forth in claim 6, wherein the polyamide resin is at least one polyamide resin selected from the group consisting of polyamide 6, polyamide 66, polyamide 46 and polyamide 610.

8. A polyamide hollow fiber membrane as set forth in claim 6, wherein the polyamide resin contains filler particles in a proportion of 5 to 100 mass %.

* * * * *